United States Patent
Lee et al.

(10) Patent No.: US 8,661,463 B2
(45) Date of Patent: Feb. 25, 2014

(54) METHOD AND SYSTEM OF MARKING AND RECORDING CONTENT OF INTEREST IN A BROADCAST STREAM

(75) Inventors: Sean S. Lee, Rockville, MD (US); Timothy E. Callaway, Laurel, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 551 days.

(21) Appl. No.: 12/132,122

(22) Filed: Jun. 3, 2008

(65) Prior Publication Data

US 2009/0300684 A1 Dec. 3, 2009

(51) Int. Cl.
*H04N 7/16* (2011.01)

(52) U.S. Cl.
USPC ........ 725/9; 725/10; 725/34; 725/39; 725/58; 725/68; 725/109; 725/110; 725/139; 725/141; 725/153

(58) Field of Classification Search
USPC ......... 725/9, 139, 141, 153, 109, 110, 58, 10, 725/39, 34, 68
See application file for complete search history.

(56) References Cited

U.S. PATENT DOCUMENTS

| | | | |
|---|---|---|---|
| 4,230,990 A | 10/1980 | Lert et al. | |
| 4,866,719 A | 9/1989 | Morgan et al. | |
| 4,967,273 A | 10/1990 | Greenberg | |
| 5,200,822 A | 4/1993 | Bronfin et al. | |
| 5,450,122 A | 9/1995 | Keene | |
| 5,649,283 A | 7/1997 | Galler et al. | |
| 5,937,331 A | 8/1999 | Kalluri et al. | |
| 6,243,145 B1 | 6/2001 | Schlarb et al. | |
| 6,397,039 B1 | 5/2002 | Butte et al. | |
| 6,604,224 B1 | 8/2003 | Armstrong et al. | |
| 7,712,123 B2 * | 5/2010 | Miyaoku et al. | 725/109 |
| 2002/0054068 A1 * | 5/2002 | Ellis et al. | 345/716 |
| 2002/0174438 A1 | 11/2002 | Cleary et al. | |
| 2003/0005457 A1 | 1/2003 | Faibish et al. | |
| 2003/0028890 A1 | 2/2003 | Swart et al. | |
| 2003/0051252 A1 * | 3/2003 | Miyaoku et al. | 725/109 |
| 2003/0208767 A1 * | 11/2003 | Williamson et al. | 725/93 |
| 2004/0040035 A1 | 2/2004 | Carlucci et al. | |
| 2004/0244036 A1 | 12/2004 | Wright | |
| 2004/0255325 A1 | 12/2004 | Furui et al. | |

(Continued)

FOREIGN PATENT DOCUMENTS

| | | |
|---|---|---|
| EP | 1100268 A2 | 5/2001 |
| EP | 1244309 A1 | 9/2002 |

OTHER PUBLICATIONS

Chilean Office action received Jul. 12, 2010 in Chilean Patent Application No. 1350-2009 filed Jun. 3, 2009 by Sean S. Lee et al.

(Continued)

*Primary Examiner* — Jivka Rabovianski

(57) ABSTRACT

A system and method for marking and recording content includes a network operation center receiving an incoming programming stream, monitoring the incoming programming stream, generating descriptive data corresponding to the programming stream, combining the descriptive data with the programming stream to form a composite signal and broadcasting the composite signal to a receiving unit. The system may also include a receiving unit having a monitoring term stored therein. The receiving unit monitors the composite signal for the monitoring term within the descriptive data and storing content or sub-content in a memory of the receiving unit when a monitoring term corresponds to the descriptive data.

22 Claims, 7 Drawing Sheets

(56) References Cited

U.S. PATENT DOCUMENTS

| | | |
|---|---|---|
| 2005/0010944 A1 | 1/2005 | Wright et al. |
| 2005/0015816 A1 | 1/2005 | Christofalo et al. |
| 2005/0060754 A1 | 3/2005 | Simyon |
| 2005/0278747 A1 | 12/2005 | Barton et al. |
| 2006/0026648 A1* | 2/2006 | Kirihara et al. .................. 725/58 |
| 2006/0117365 A1* | 6/2006 | Ueda et al. .................... 725/112 |
| 2006/0195886 A1 | 8/2006 | Ashley |
| 2007/0040934 A1 | 2/2007 | Ramaswamy et al. |
| 2007/0058949 A1 | 3/2007 | Hamzy et al. |
| 2007/0124789 A1 | 5/2007 | Sachson et al. |
| 2008/0015966 A1 | 1/2008 | Altius |
| 2008/0112686 A1 | 5/2008 | Chen et al. |
| 2008/0115171 A1 | 5/2008 | Barsness et al. |
| 2008/0172693 A1 | 7/2008 | Ludvig |
| 2008/0232782 A1 | 9/2008 | Kanemaru et al. |

OTHER PUBLICATIONS

Non-final Office Action dated Apr. 30, 2009 in U.S. Appl. No. 11/728,552, filed Mar. 26, 2007 by Daniel M. Miner.
Final Rejection dated Dec. 20, 2011 in U.S. Appl. No. 12/102,362, filed Apr. 14, 2008 by Timothy E. Callaway et al.
Non-final Office action dated Jul. 20, 2011 in U.S. Appl. No. 12/102,362, filed Apr. 14, 2008 by Timothy E. Callaway et al.
Isnardi, Michael; "ATSC Program and System Information Protocol (PSIP)"; Sarnoff Corporation; Oct. 18, 2000; pp. 9-12.
Non-final Office action dated Nov. 16, 2012 in U.S. Appl. No. 12/102,362, filed Apr. 14, 2008 by Timothy E. Callaway et al.
Final Rejection dated May 7, 2013 in U.S. Appl. No. 12/102,362, filed Apr. 14, 2008 by Timothy E. Callaway et al.
Non-final Office action dated Nov. 13, 2013 in U.S. Appl. No. 12/102,362, filed Apr. 14, 2008 by Timothy E. Callaway et al.

* cited by examiner

METHOD AND SYSTEM OF MARKING AND RECORDING CONTENT OF INTEREST IN A BROADCAST STREAM

TECHNICAL FIELD

The present disclosure relates generally to broadcast programming and, more specifically, to a method and system for marking a broadcast stream and recording content or sub-content. The system is suitable for marking live content

BACKGROUND

The statements in this section merely provide background information related to the present disclosure and may not constitute prior art.

Recording video content on a recording device such as a digital video recorder is commonplace. A digital video recorder may record content according to a predetermined start time and a predetermined end time for a particular recording event. Digital video recorders may also be automatically programmed to record content that corresponds to the preferred attributes of the device owner. The automatically programmed content is also recorded at times corresponding to a predetermined start time and predetermined end time. The start time and end time of the automatically programmed content may be determined from a program guide.

Live events are often broadcasted and can sometimes extend beyond their predetermined end time. Various types of content including sporting events, concerts and other live events such as award shows have the potential to extend beyond their predetermined end time. In the case of a sporting event, the most exciting portions of the event may take place at the very end. Thus, when the digital video recorder records such material, the predetermined end time is reached and the recording is stopped. Thus, the end of the event is not recorded.

Often times, during live events such as news programs or specific type of program such as ESPN® Sports Center™, an entire program may not be of interest. However, a user may have interest in a small sub-portion or sub-content within the larger program.

SUMMARY

The present disclosure may be used to monitor video streams and, in particular, live video streams and place or inject coded signals there into. The coded signals correspond to descriptive data. The coded signals injected or combined into the video stream may serve to act as identifiers to allow receiving devices to more easily record programming. The coded signals may change through a broadcast such as a news event, or the like, so that particular sub-programs, such as news clips and the like may be recorded for areas of interest to users of the receiving device. Examples include injecting a particular team name into the live stream so that clips in a news program that pertain to the particular team may be recorded at the receiving device. Of course, the coded signals may correspond to various general categories of content or specific categories of content. The types of coded signals may also correspond to particular people, team names, cities names, or the like.

In one aspect of the disclosure, a method includes monitoring an incoming programming stream at an operation center, generating descriptive data corresponding to the programming stream, combining the descriptive data with the programming stream to form a composite signal and broadcasting the composite signal.

In a further aspect of the disclosure, a system includes a network operation center receiving an incoming programming stream, monitoring the incoming programming stream, generating descriptive data corresponding to the programming stream, combining the descriptive data with the programming stream to form a composite signal and broadcasting the composite signal to a receiving unit. The system may also include a receiving unit having a monitoring term stored therein. The receiving unit monitors the composite signal for the monitoring term within the descriptive data and storing content or sub-content in a memory of the receiving unit when a monitoring term corresponds to the descriptive data.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
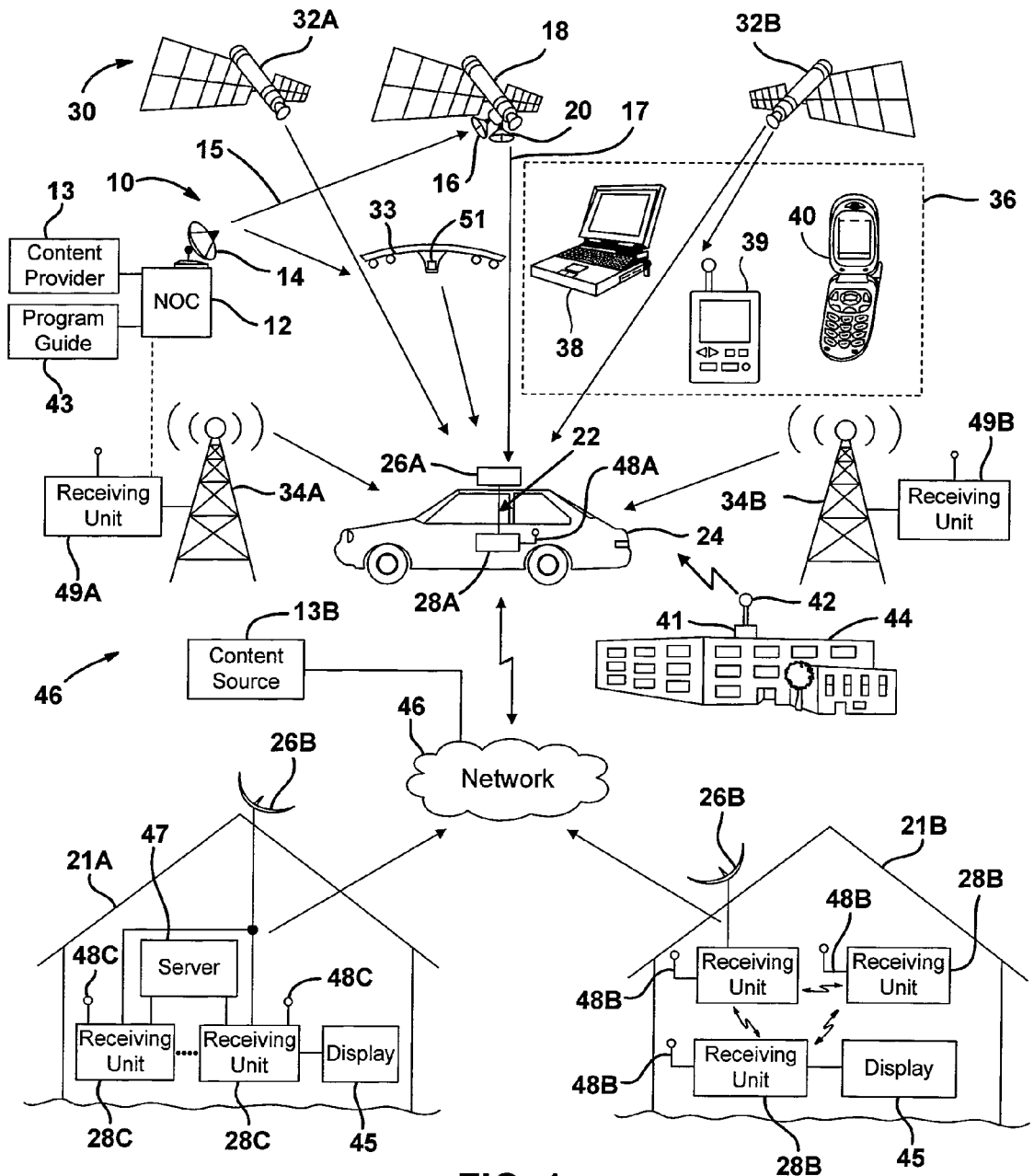
FIG. 1 is a block diagrammatic system view of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcasting system 10 is set forth in the following example. The satellite television broadcasting system 10 includes a network operations center (NOC) 12 in communication with various content providers 13. The NOC 12 may also be referred to as a head end. Various programming content may be provided from the content providers 13 including movies, sporting events and the like. The content providers 13 may provide live feeds as well as recorded material. The content providers may thus provide signals or media. The live feeds may include various types of programming which have various types of content including sub-content or segment. As an example, the content may be a live news program and the sub-content may be news segments or clips.

The network operations center 12 generates wireless communication signals 15 through a transmitting antenna 14 which are received by a receiving antenna 16 of a high altitude device such as a spaced-based satellite 18. The wireless communication signals, for example, may be digital, digital video, data or digital audio. As will be described below, the wireless communication signals may be entertainment content, live content, traffic, weather, hazardous material warning areas or advertising marketing. The wireless signals 15 may be referred to as uplink signals.

The signals 15 may include content signals which may include sub-content signals. The signals 15 may be coded with descriptive data that corresponds to the video and/or audio of the content. The coded signals may change during sub-content so that clips or sub-content can be identified.

The signals 15 may be coded with numeric terms, alphanumeric terms or alphabetic terms to provide a description of the content or sub-content. The codes correspond to a description of the audio and/or video of the content. Key words may be chosen to form the description such as the team name, type of event, names, places, general category, or other descriptors. The coded signals are provided so that the recording device can easily recognize content or sub-content to record. The recording unit thus forms a recording service for content or sub-content based on the descriptive data (which may be coded).

Wireless communication signals 17 such as downlink signals may be generated from the satellite 18 and may include location-specific signals with location information therein. The location information may correspond to a geographic area in which the location specific information is valid or suitable for. A transmitting antenna 20 or the satellite 18 communicates the downlink signals 17 to various receiving systems including stationary systems such as those in homes 21A, 21B or buildings 44 as well as mobile receiving systems 22. The wireless signals may have various types of information associated with them including location information. The wireless signals may also have various video and audio information associated therewith.

The mobile receiving system 22 is disposed within an automotive vehicle 24. Several mobile systems 22 may be incorporated into a network. The mobile receiving system 22 includes a receiving antenna 26A that receives the wireless signals 17 from the satellite 18 and processes the signals in a receiving unit 28A. The mobile receiving unit 28 will be further described below. The receiving unit 28 may include a network antenna 48A.

The network antennas 48A may be antennas suitable for communicating with other receiving units in a network 46. The vehicle 22 may represent a node of the network 46. The network 46 may be various types of wireless networks such as an 802.11a/b/g wireless network. Other types of networks may be a WiMax network. The network may also comprise terrestrial components or a combination of terrestrial and satellite components. The network may contain both mobile and stationary receiving units.

The network 46 may be referred to as a mesh network. The receiving units within the network 46 are only capable of communicating a certain distance. Thus, mobile receivers may enter and leave the range of other receivers. Thus, at any given time the network make-up may change.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. The towers 34 may also be cellular phone, radio or TV towers generating location signals. Cellular phones typically include a GPS locating system. As the vehicle 24 or mobile devices move, the exact coordinates in latitude and longitude may be used to determine the proper area of interest such as a designated marketing area which will control the mobile device's choices for local television, advertising and other broadcasted data.

Each of the cellular towers 34A and 34B may include respective receiving units 49A and 49B used to receive signals from the satellite and also receives signals from the network. The receiving units 49A, 49B may be referred to as stationary receiving units. The stationary receiving units 49A, 49B may form nodes of the network 46. The receiving units 49A, 49B may also terrestrially receive signals from the network operations center 12 through a wired or wireless connection. The towers 34A, B may redistribute the content to the other receiving units.

In addition, the satellites 18 may also be replaced with another high altitude device such as a stratospheric platform 33 for transmitting content to the mobile device, transmitting communication signals, transmitting lost content segments and transmitting location-specific signals. Stratospheric platforms 33 are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The stratospheric platforms 33 may also include a receiving unit 51 that is used to receive signals from the satellite 18 and communicate signals through the network 46. The receiving unit 51 may be referred to as a stationary unit since the stratospheric platform maintains a particular position above the earth. The receiving unit 51 may also become part of the wireless network 46 and thus be used to transfer content segments or packets to another node of the device. The receiving units 49A, 49B and 51 may also be referred to as nodes of the network 46.

The present invention may also be used for displaying and communicating various wireless communication signals on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Each of the personal mobile device 36 may also be a node within the network 46. That is, each of the personal devices may be used to communicate content segments or packets to other devices in the node.

A building 44 having a receiving unit 41 with an antenna 42 may be used as a node of the network 46. The receiving unit 41 may be referred to as a stationary unit. The receiving unit 41 may be in communication with the satellite 18 and with the network 46. For a dedicated network node, the receiving unit 41 may be operated by the operator of the content distribution system.

The home 21A may include user receiving units 28C that are in communication with a server 47. Each receiving unit 28C and/or server 47 may communicate with the satellite through the antenna 26B. Each receiving unit 28C may also be in communication with a display 45 such as a television. Each receiving unit 28C may be associated with a display 45. Only one of which is shown for simplicity. The receiving unit 28C may be wirelessly in communication with the server 47 or a wired communication with server 47. An antenna 48C may be used by each receiving unit 28C to wirelessly be communicated if the system is so equipped.

The home 21B illustrates a plurality of receiving unit 28B that form a network but may also be in communication with the network 46. Both homes 21A and 21B may form separate networks that may or may not be in communication with the outside network 46. The receiving unit 28B may include network antennas in 48B. Each user device 48B may be in communication with the satellite antenna 26C. Of course, satellite antennas 26B and 26C may include multiple antennas. Each receiving unit may also be associated with a display 45. Only one display 45 is illustrated in each home 21A, 21B for simplicity.

A program guide system 43 may provide content guide information to the network operation center 12. The program guide system 43 organizes data available regarding the programming channels and organizes them for ultimate transmission to the receiving devices including 28A-C and 49A-B. The receiving devices may receive the program guide data and display a grid guide in response thereto. The program guide data may be referred to as program objects. The program object may also include identifiers for the type of program (movie, sports, series), a series or short identifier and an episode number for a series. As will be further described below, a content identifier, a Tribune Media Services® ID, a program information packet or another identifier may be used as an identifier for a particular program. These may be found in the data corresponding to the program guide system 43. The same or equivalent program or event may have the same or similar packet identifier, program-associated data, Tribune Media Services® ID or content identifier.

Figure 2:
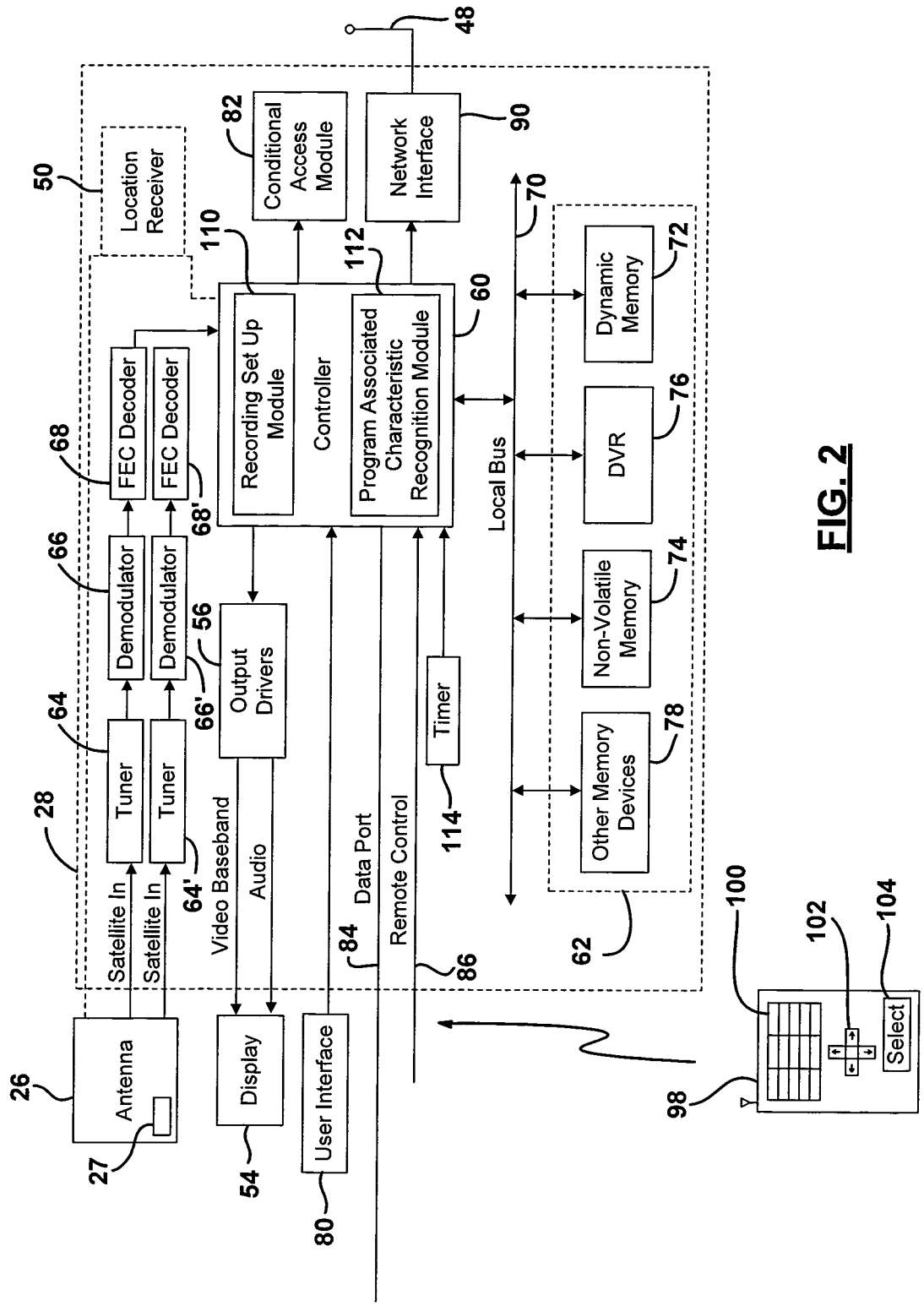
FIG. 2 is a detailed block diagrammatic view of a receiving unit of FIG. 1.

Referring now to FIG. 2, the various receiving units described above are collectively referred to as receiving unit 28 which is illustrated in further detail. The stationary receiving units 41, 49A, 49B, 51 and the personal mobile devices may also be configured in a similar manner to that of the receiving units 28. The receiving units 28 may also be referred to as receiving devices or user devices. Antenna 26 may be various types of antennas including a rotating antenna which is used to track the relative movement of the satellite or other transponding device with respect to a vehicle. The antenna 26 may be a single antenna used for satellite television reception, or a number of antennas such as one for receiving television signals and one coupled to a location receiver 50 such as GPS receiver if used in a mobile device. The antenna 26 may also be an electronic antenna. The antenna 26 may include an internal controller 27 that controls the operation of the antenna 26, which is suitable for a moving or rotatable antenna. The stationary receiving units 28B, 28C, 41, 49A, 49B and 51 units may include a stationary antenna rather than a tracking antenna.

The location receiver 50 may be integrated into the receiving device 28 or outside the device. The location receiver 50 may be a GPS receiver. In a preferred embodiment, only one location receiver 50. However, the location receiver 50 may be external to the receiving unit such as part of the vehicle 24 or other part of the mobile receiving system. A controller 60 may be coupled directly to location receiver 50.

The location receiver 50 is capable of providing latitude and longitude to the controller 60. The controller 60 may be used to compare the location signals from the location receiver 50 to the boundaries of the areas of interest such that the mobile device can determine which areas of interest it is within and which areas of interest it is not within. From this determination it can control the receiving unit behavior such as allowing or disallowing display of certain audio or video channels or advertising or the like. The stationary receiving units 41, 49A, 49B and 51 units may not include the location receivers 50, 52.

The receiving unit 28 includes a display 54 associated therewith. The display 54 may be incorporated into the unit 28 or may be external to the receiving unit such as part of a vehicle 24 or television. The display 54 may have output drivers 56 used for generating the desired audio and video outputs suitable for the particular display 54. The stationary receiving units 28B, 28C, 41, 49A, 49B and 51 units may or may not include a display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DIRECTV® set top boxes which employ a chip-based multifunctional controller.

It should be noted that more than one tuner 64, demodulator 66 and forward error correction decoder 68 may be provided in the system. In this example, a second tuner 64', a second demodulator 66' and a second forward error correction decoder 68' may be provided in the receiving unit 28. Of course, various numbers of tuners may be incorporated into a receiving unit 28. The tuners 64, 64' may be used to scan various channels for content having a descriptive data corresponding to monitoring terms selected by the user of the receiving device. Entire program contents may be stored or sub-content portions may be stored. This will be described in further detail below.

The system may be scalable in that a cluster or network may consist of a few receiving devices within a building such as a house or dozens or hundreds of devices. Because massive amounts of bandwidth may be available in the near future, clusters may be able to communicate with each other to share programs is realistic. Constraints now include the amount of bandwidth available. Further, each receiving device does not necessarily need to be in communication with a satellite. Some user devices merely may receive information directly from another user receiving device. Further, clusters of devices may include a service provider supported cluster that is used to provide material. For example, the building 44 may be a network operator supported building that may provide content to other users within the network 46. The methods described below may be used to transfer the content to the various devices.

The controller 60 may include or be coupled to a local bus 70. The local bus 70 may be used to couple a memory including dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of a non-volatile memory is an EEPROM. One specific type of EEPROM is flash memory. Flash memory is suitable since it is sectored into blocks of data segments that may be individually erased and rewritten.

A digital video recorder (DVR) 76 may also be coupled to the local bus 70. The digital video recorder 76 may be within the receiving device 28 or coupled to the receiving device. The digital video recorder 76 may be used to store programming content or sub-contents.

Other memory devices 78 may also be coupled to local bus 70. The other memory devices may include other types of dynamic memory or non-volatile memory. The display 54 may be changed under the control of controller 60 in response to the data in the dynamic memory 72 or non-volatile memory 74. Part of the memory 62 may be used as a buffer.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 64 is illustrated as part of the receiving unit 28. However, should the unit 28 be incorporated into a vehicle, the user interface 80 may be located external to the mobile receiving unit such as dial buttons, voice activated system, or the like incorporated into the vehicle and interface with the receiving unit.

A conditional access module 82 (CAM) may also be incorporated into the receiving unit. The access module 82 may include software to allow the receiving unit 28 access to various channels and wireless signals generated by the system. Not having an access card or not having an up-to-date access card 82 may prevent the user from receiving or displaying various wireless content from the system.

One user interface is a remote control device 98 having a key pad 100, an arrow key pad 102, and a select button 104 may also be provided. Inputs to the receiver 28 may be provided by the remote control device 28 or through another type of user interface 80.

The receiving unit 28 may include a network interface 90 for interfacing with other nodes of the network. The antenna 48 is used to communicate with other nodes of the network. The network interface 90 may be various types of communication cards such as an 802.11a/b/g wireless communication card, a WiMax card, or other types of wireless devices.

The controller 60 may include a recording setup module 110 that is used for recording various programming events on the digital video recorder 76. The recording setup module 110 may be programmed to record various programs based upon personal automatically determined preferences, user supplied preference such as key words or monitoring terms or by directly selecting various content to be recorded. Live events, as well as pre-recorded events, may be recorded using the recording setup module 110. During the setup process, the start time and a finish time are established for the recording event. The end time for a live event, such as a sporting event, awards program or other types of events, may vary depending on the various conditions. For example, various sporting events may include an overtime or extended periods that may be played during a tie. A baseball game may have a slight rain delay or postponement and thus the end time may be extended. The end time may also be shorter than the originally-planned end time due to a weather-related event such as in a baseball game when the game is called early due to inclement conditions.

The recording set up module 110 may allow the user to input various data, key word or monitoring terms that also allow recording of entire program or sub-content such as clips or the like. The user may input a particular channel such an ESPN®, a group of channels, type of a group of channels such as sports or all channels for review for content or sub-content.

The present disclosure may be used to adjust the predetermined end time based on characteristic recognition associated with various programming content. The control 60 may include a program-associated characteristic recognition module 112. The program-associated recognition module 112 is used for changing the end time of a recording event due to characteristics of the program. A program-associated identifier, visual queues within the video, a pattern of the broadcast stream and close-captioning data may be monitored in various combinations, altogether or individually. The details for recognizing the end of an event being extended is set forth below. It should be noted that the modules 110 and 112 may also be physically present in the DVR 76 rather than in controller 60. The DVR 76 may also be a separate component attached to the receiving unit 28.

A timer 114 may be included in the receiving unit 28 for timing various events such as determining the end time of a recording event. Again, the timer 114 may also be included within the DVR 76.

Figure 3:
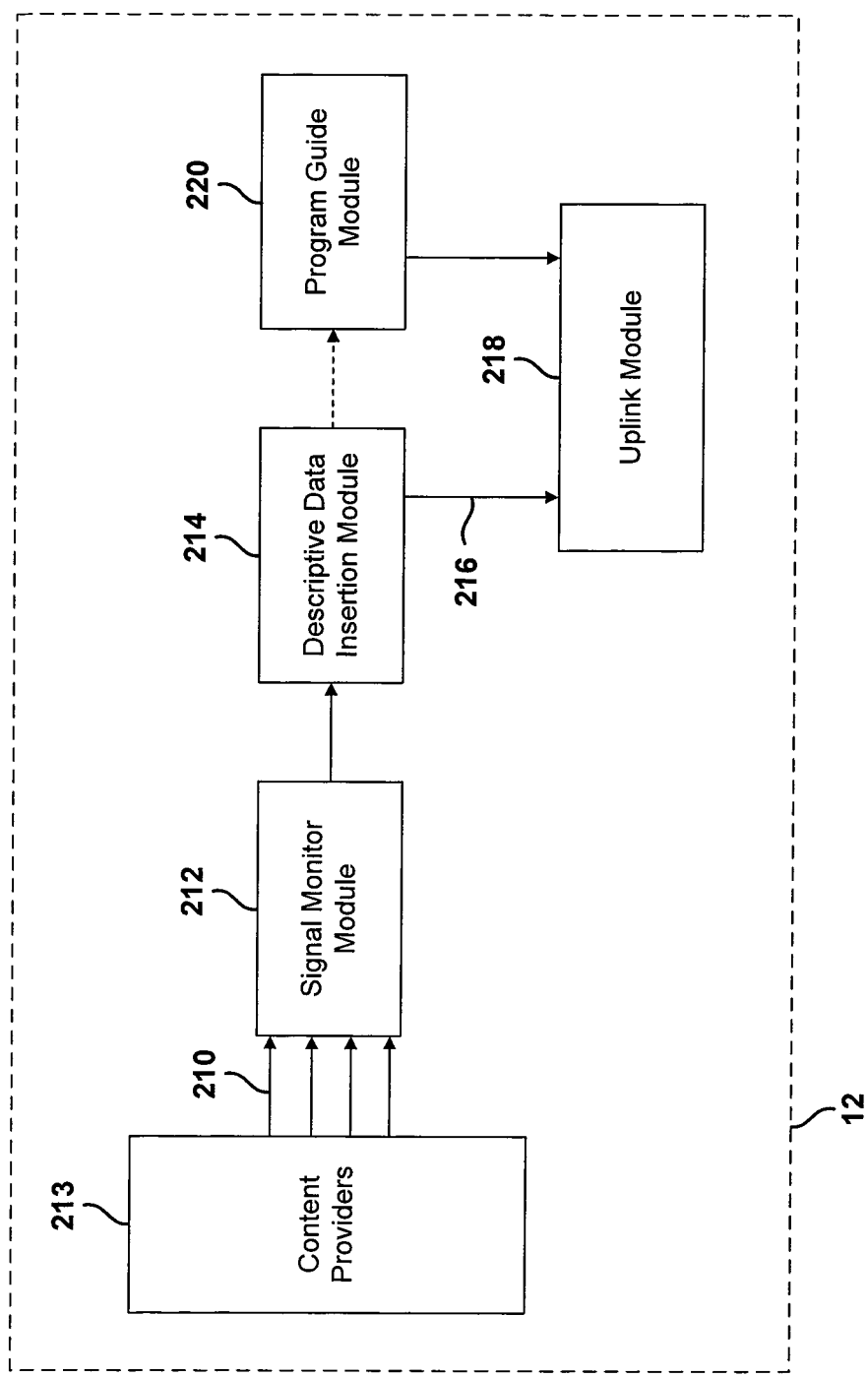
FIG. 3 is a detailed block diagrammatic view of a network operations center.

Referring now to FIG. 3, a detailed block diagrammatic view of the head end or network operation center 12 of FIG. 1 is illustrated. Incoming signals 210 may be received from various content providers 13. The content providers 13 may provide live signal feeds or programming streams as well as providing taped material. The particular monitoring process is particularly suitable for live content. A signal monitor module 212 monitors the incoming signals 210 from the content providers 13. The signal monitor module 212 may generate descriptive data that corresponds to the received programming stream. As mentioned above, the descriptive data may be key words or coded signals corresponding to key words. Word recognition for spoken words as well as visual recognition of on-screen displays, and the like, may be used to formulate descriptive data. A descriptive data insertion module 214 may be used to combine descriptive data with the video stream to form a composite signal 216. The composite signal 216 may be provided to an uplink module 218 for uplinking to a satellite. While a satellite has been described above, the present system may also be used as a cable head end or the like for communicating content signals to users. Also, the descriptive data may be provided to the program guide module 220. The program guide module may thus also include some descriptive data that is ultimately communicated to the user devices.

The descriptive data may include the actual text of words or codes associated with the data. Sports team names, cities, athletes, politicians, or other key words may be determined from the video stream. These may be determined automatically as well as input by operators monitoring the signals. It should be noted that the data may change during the course of a particular broadcast. For example, various clips within a newscast or sportscast may include different data which corresponds to the different sports teams being discussed. Executives may also find such a service useful as a clipping service discussing their own company or competitors. Thus, the data may also include names of companies, personnel or other industry attributes as well.

Figure 4:
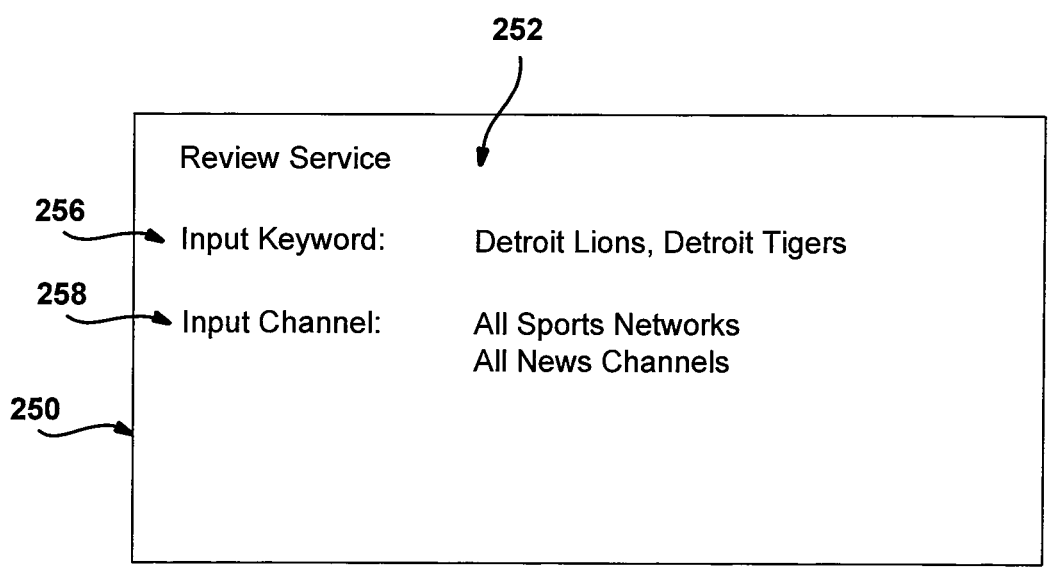
FIG. 4 is a screen display illustrating a recording service graphical user interface.

Referring now to FIG. 4, a screen display 250 corresponding to a review service graphical user interface is set forth. The graphical user interface 252 may include a title 254 for the particular service. The recording service may be entered by using the input device associated with the receiving unit. The user interface 252 may include various types of interfaces that allow the entry of various input key words 256. For sports fans, various team names, player names, or general sports categories may be used as key words. Logical operators such as AND, OR and NOT may be used in the key word determination. Also, it may be desirable not to search every channel but to search a group of channels or type of channels. For example, an input channel input 258 may provide a selection for all sports networks, or all news networks as illustrated. However, various local channels, single channels, groups of local channels may all be selected.

As mentioned above, the recording service may be used by various types of people including executives. Various key words such as competitors' names, personnel names or industry categories may also be provided in the input key word section 256. Input channels may include business, television network channels or other news organizations.

Figure 5:
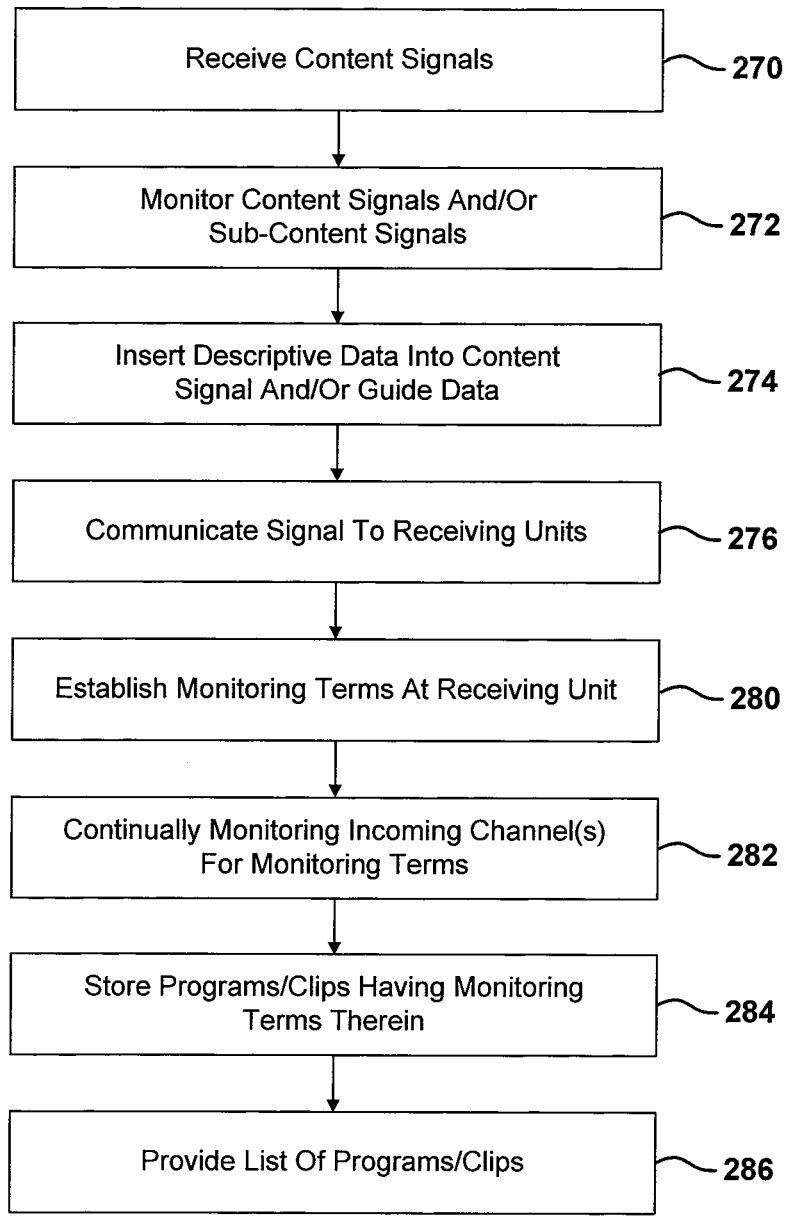
FIG. 5 is a flowchart of a method of recoding content and sub-content according to descriptive data

Referring now to FIG. 5, a method for recording programs, content or sub-content is set forth. In step 270, content signals are received from various content providers. As mentioned above, live feeds may be received content signals. In step 270, the content signals are monitored. The content signals may also include the sub-content signals for various portions of the signals. In step 274, descriptive data corresponding to the content signals is formulated and inserted into the content signal and/or guide data. As mentioned above, the descriptive data may be formed in various ways including automatically through voice or video recognition or may be inserted through manual controls such as through the use of operators. In step 276, the signal may be receiving units. The signal may be a composite signal that includes the descriptive data added at the head end or network operation center. The data is communicated to the receiving units by methods that depend on the type of system. The data may be uplinked through a satellite to the receiving units or communicated through a cable.

In step 280, the monitoring terms are established at the receiving unit. Monitoring terms may be input directly or may be selected from various menus. As mentioned above, the monitoring terms may include sporting events, people, city names, proper nouns, or various other search terms. In step 282, the descriptive data for the incoming channel or channels may be reviewed for the monitoring terms. The monitoring may take place by tuning the tuner to various channels or a channel to determine if the descriptive data in the received signals corresponds to any or all of the search terms. A comparison may thus be performed between the established monitoring terms and the descriptive data and if correspondence is found, the program or program clips may be stored within the receiving device. Storage of the clip or clips may take place within the memory of the recording device such as the digital video recorder as described above. It should be noted that the descriptive data may be communicated to the receiving unit 28 in a different manner than the main signal. For example the satellite may communicate the television broadcast signal and the internet, cellular phone network, wireless or wired network may communicate the descriptive data.

A list may be compiled and presented to the user on a graphical user interface so that the different content clips may be selected and played back from the receiving unit onto a display.

Figure 6:
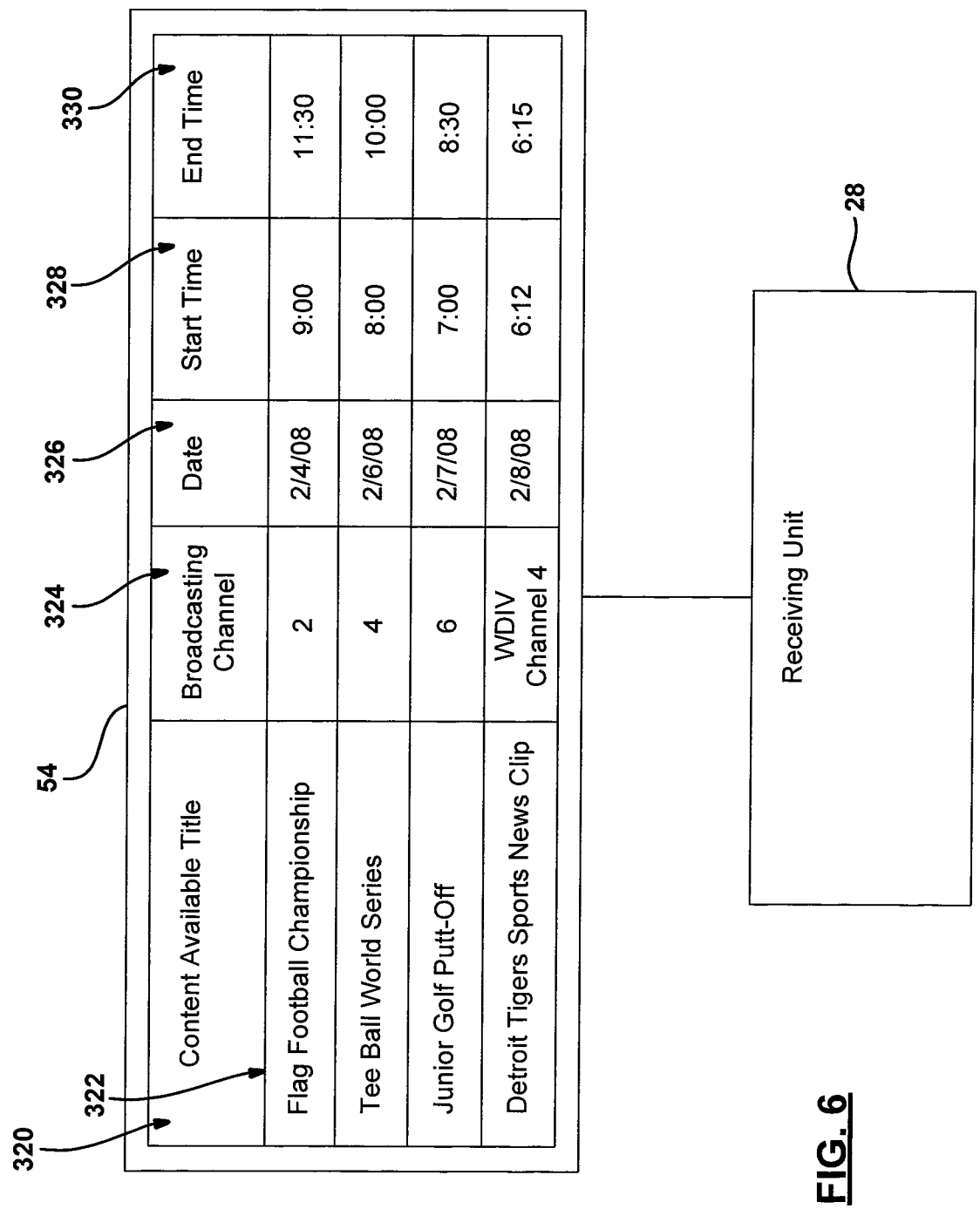
FIG. 6 is a screen display illustrating various content available to be played back.

Referring now to FIG. 6, a receiving unit 28 is illustrated with display 54 illustrating a screen display 320. The screen display 320 may be generated by the receiving unit 28 for displaying content including sub-content that has been recorded. The display may be lists or provide the list in a grid guide format. The screen display 320 may include content available titles in column 322. As illustrated, line 1 includes flag football championship, line 2 includes T-ball World Series, line 3 includes junior golf putt-off and line 4 includes a Detroit Tigers clip for WDIV Channel 4 in Detroit.

The screen display 320 may also include a column 324 for broadcasting channel which may include a logo or other information in the program guide. Call letters or an abbreviation for the network may also be provided in the broadcasting channel column 324. A date column 326 may also be provided. The date column 326 may be used to convey the date that the particular program was broadcast.

The screen display 54 may also include the start time column 328 and an end time column 330.

Figure 7:
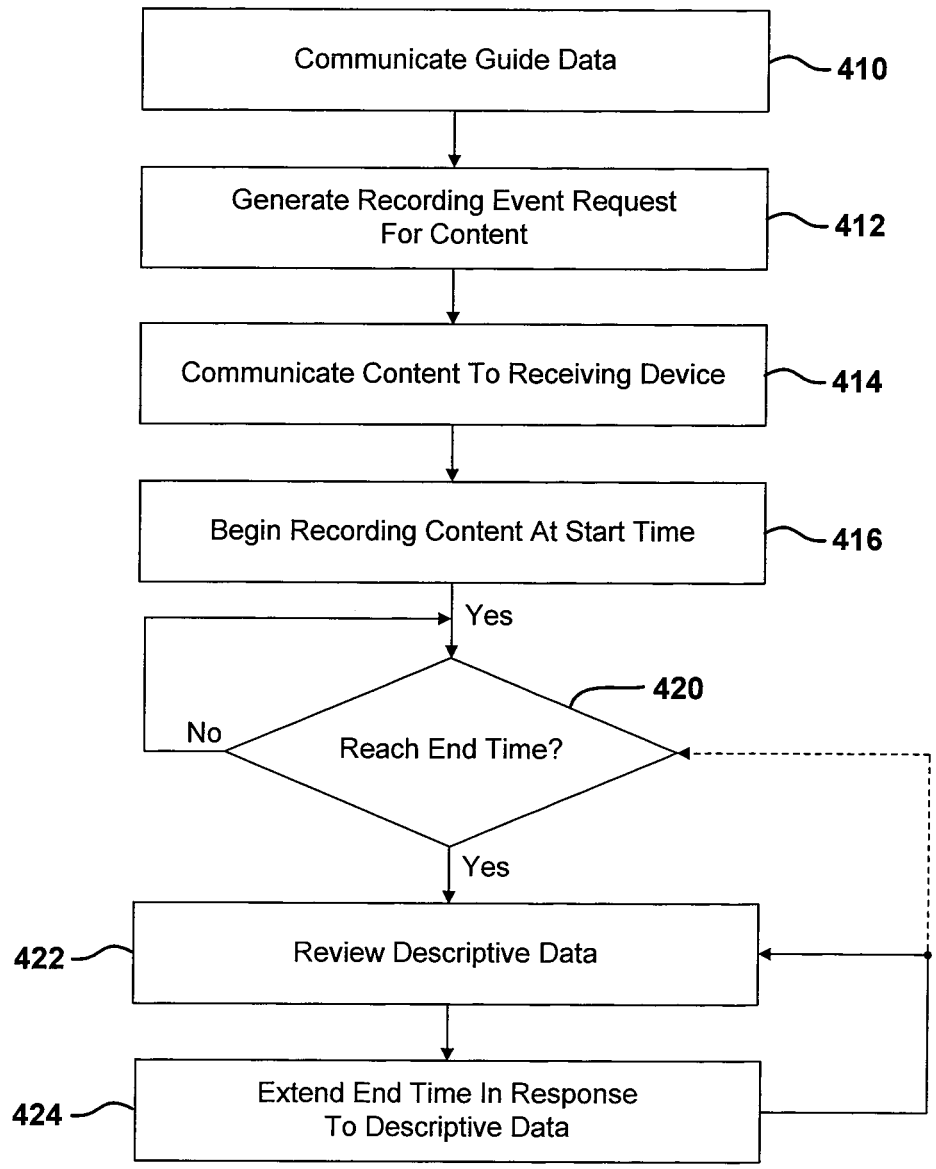
FIG. 7 is a flowchart of a method for extending the end time of a recording event in response to the descriptive data.

Referring now to FIG. 7, a method for changing the end time of a recording event based on the descriptive data is set forth. The end time of a recording may be extended based upon the descriptive data inserted into the composite signal. It should be noted that the present system may be used with various types of broadcasting systems. Broadcasting systems, as mentioned above, may be cable, Internet, or other wired or wireless connections. Program guide data and program content may be communicated to receiving devices using different means.

In step 410, guide data is broadcast to various receiving devices. In step 412, a recording event request for content is generated. The recording request event may be generated automatically due to preferences set within the recording device or may be programmed individually by a user. The recording request may also be generated remotely through an Internet connection, mobile phone or other device.

After step 412, step 414 communicates content to the receiving device. The content may be communicated in various methods including through the Internet, through a network, or through a satellite. The order of the steps may be changed. For example, the content may be communicated to the device continually.

In step 416, the recording content corresponding to the recording event may be started at the predetermined start time.

In step 420, it is determined whether the predetermined end time has been reached. If the end time has not been reached, step 420 is repeated. In step 420, if the end time has been reached, step 422 is performed. In the case of shortening an end time, this step may be eliminated.

In step 422, the descriptive data associated with the content stream is determined. The descriptive data may be a variety of types of data as mentioned above.

In step 424, the predetermined end time of the recording event is extended in response to the descriptive data. The end time may be extended in predetermined time or the associated characteristics may be continually reviewed to determine when the end of the program is reached. Thus, steps 422 and 424 may be repeated continually. If a predetermined end time is set, steps 420-424 may be repeated rather than just steps 422-424.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving an incoming programming stream at a head end;
   monitoring the incoming programming stream at a signal monitor of the head end;
   generating descriptive data at the signal monitor corresponding to the programming stream received at the head end, said descriptive data comprising key words corresponding to spoken words or visual recognition of words in on-screen displays of the programming stream at the head end in response to monitoring;
   combining the descriptive data with the programming stream to form a composite signal;
   broadcasting the composite signal to a receiving unit from the head end;
   generating a recording event request for content having a start time and a first end time at the receiving unit;
   storing content in a memory of the receiving unit starting at the start time; and
   thereafter, generating a time extension for the first end time at the receiving unit of a program within the composite signal in response to the key words.

2. A method as recited in claim 1 wherein monitoring an incoming programming stream comprises monitoring a live incoming programming stream.

3. A method as recited in claim 1 wherein monitoring an incoming signal comprises monitoring a live incoming programming stream corresponding to a sporting event.

4. A method as recited in claim 1 wherein generating descriptive data comprises generating descriptive data for sub-content.

5. A method as recited in claim 1 wherein broadcasting the composite signal comprises broadcasting the composite signal to a receiving unit through a satellite.

6. A method as recited in claim 1 wherein broadcasting the descriptive data comprises broadcasting the descriptive data to a receiving unit through a wireless connection.

7. A method as recited in claim 1 wherein broadcasting the descriptive data comprises broadcasting the descriptive data to a receiving unit via satellite.

8. A method as recited in claim 1 wherein broadcasting the descriptive data comprises broadcasting the descriptive data to a receiving unit through a wireless network such as a cellular telephone network.

9. A method as recited in claim 1 wherein broadcasting the descriptive data comprises broadcasting the descriptive data to a receiving unit through a wired network such as the Internet.

10. A method comprising:
    receiving an incoming programming stream at a head end;
    monitoring the incoming programming stream at a signal monitor of at the head end;
    generating descriptive data at the signal monitor corresponding to the programming stream received at the head end, said descriptive data comprising key words corresponding to a spoken words or visual recognition of words in on-screen displays of the programming stream at the head end in response to monitoring;
    combining the descriptive data with the programming stream to form a composite signal;
    broadcasting the composite signal to a receiving unit from the head end;
    establishing a monitoring term at the receiving unit;
    monitoring the composite signal for the monitoring term within key words of the descriptive data; and
    storing content or sub-content in a memory of the receiving unit when the monitoring term corresponds to a first key word in the descriptive data.

11. A method as recited in claim 10 wherein broadcasting the composite signal comprises broadcasting a plurality of composite signals, and wherein monitoring the composite signal comprises monitoring the plurality of composite signals and storing content or sub-content.

12. A method as recited in claim 11 wherein storing content in a memory comprises storing content in a digital video recorder.

13. A method as recited in claim 11 further comprising communicating first program guide data to a receiving device.

14. A method as recited in claim 11 wherein broadcasting the composite signal to a receiving unit comprises broadcasting the composite signal to a receiving unit through a satellite.

15. A method as recited in claim 10 wherein generating descriptive data comprises generating video and audio descriptors.

16. A system comprising:
    a network operation center receiving an incoming programming stream, monitoring the incoming programming stream at a signal monitor, generating descriptive data at the signal monitor corresponding to the programming stream received at the head end, said descriptive data comprising key words corresponding to spoken words or visual recognition of spoken words in on-screen displays of the programming stream in response to monitoring, combining the descriptive data with the programming stream to form a composite signal and broadcasting the composite signal; and
    a receiving unit receiving the composite signal, generating a recording event request for content having a start time and a first end time, storing content in a memory starting at the start time, and generating a time extension for the first end time of a program within the composite signal in response to the key words.

17. A system as recited in claim 16 wherein the incoming programming stream comprises a live incoming programming stream.

18. A system as recited in claim 16 wherein the descriptive data comprises descriptive data for sub-content.

19. A system further comprising:
- a network operation center receiving an incoming programming stream, monitoring the incoming programming stream at a signal monitor, generating descriptive data corresponding to the programming stream received at the head end comprising key words corresponding to spoken words or visual recognition of spoken words in on-screen displays of the programming stream in response to monitoring, combining the descriptive data with the programming stream to form a composite signal and broadcasting the composite signal; and
- a receiving unit having a monitoring term stored therein, said receiving unit receiving the composite signal, monitoring the composite signal for the monitoring term within the key words of the descriptive data and storing content or sub-content in a memory of the receiving unit when a monitoring term corresponds to a first key word in the descriptive data.

20. A system as recited in claim 19 wherein the memory comprises a digital video recorder.

21. A system as recited in claim 19 wherein the receiving unit comprises a satellite television receiving unit.

22. A system as recited in claim 19 wherein the descriptive data comprises video and audio descriptors.

\* \* \* \* \*